Patented Jan. 6, 1942

2,268,564

UNITED STATES PATENT OFFICE 2,268,564

PROCESS OF PRODUCING CELLULOSE DERIVATIVES

Rudolph S. Bley, Milligan College, Tenn., assignor to North American Rayon Corporation, New York, N. Y., a corporation of Delaware No Drawing. Application August 4, 1940, Serial No. 351,443

19 Claims. (Cl. 260—231)

The present invention relates to a process of producing mixed cellulose ethers, i. e., polyhetero substituted cellulose ethers, in the presence of anhydrous, liquid ammonia as a dispersing and/or dissolving medium.

It is an object of the present invention to provide a process whereby partially etherified and/or esterified cellulose may be treated with an alkali metal or an alkali metal amide dissolved and/or dispersed in anhydrous, liquid ammonia in the presence or absence of an inert inorganic liquid (swelling agent) to form an alkali metal cellulosate which then may be etherified to form mixed cellulose derivatives.

It is a further object of this invention to provide a process of preparing cellulose ester-ethers or mixed cellulose ethers in the presence of anhydrous, liquid ammonia containing a dissolved or dispersed aromatic hydrocarbon, preferably an alkyl substituted, aromatic hydrocarbon.

Other objects of the present invention will become apparent to those skilled in the art from a study of the following specification.

I am well aware that it has, heretofore, been proposed to prepare alkali metal cellulosates by reacting alkali metals or alkali metal amides with cellulose in the presence of anhydrous, liquid ammonia and to convert the cellulosates thus formed into cellulose esters and ethers. However, I have unexpectedly found that cellulose ester-ethers and mixed cellulose ethers may be obtained by reacting a partially esterified and/or etherified cellulose with an alkali metal or its amide in anhydrous, liquid ammonia to form an alkali metal cellulosate of the partially substituted cellulose which may be reacted with an etherifying agent to form a mixed (polyhetero substituted) cellulose derivative. Although any alkali metal or alkali metal amide may be used in this process, I prefer to employ metallic sodium or potassium and their respective amides for reasons of economy. In carrying out the process in accordance with the present invention I introduce a substantially anhydrous, partially substituted cellulose into anhydrous, liquid ammonia preferably below its boiling point of about —33° C. at atmospheric pressure and add thereto a suitable amount of an alkali metal or alkali metal amide. The completion of the reaction is indicated by the disappearance of the characteristic color of the alkali metal or amide employed. This may require a few hours or even several days, depending upon the temperature of the ammonia, the nature of the cellulose derivative treated, the amount of alkali metal or amide introduced, the organic liquid used, etc. The reaction may be carried out at temperatures ranging from about —80° C. up to about 30° C. By varying the amount of alkali metal or alkali metal amide, it is possible to prepare mono-, di- or tri-substituted alkali metal cellulosates since cellulose has three reactive hydroxyl groups per anhydro-glucose unit $(C_6H_{10}O_5)$. Thus 1 to 3 equivalents of an alkali metal may be reacted with 1 anhydro-glucose unit of cellulose to form alkali metal cellulosates. As starting materials I may use any mono- or di-substituted cellulose derivative provided it is sufficiently stable in the ammonia at the temperature of reaction, for example cellulose monoacetate, cellulose diacetate, mono-ethyl cellulose, diethyl-cellulose, cellulose monopropionate, cellulose dipropionate, monopropyl cellulose, dipropylcellulose, mono-methyl cellulose, dimethyl cellulose, etc. In other words, I may use any cellulose derivative having one or two ester or ether groups. These ester or ether groups may be derived from identical or different hydrocarbons. Thus, I may use as starting material mono-methyl cellulose monoacetate, mono-ethyl cellulose monoacetate, monoethyl cellulose, diethyl cellulose, methyl-ethyl cellulose, methyl-propyl cellulose, ethyl-propyl cellulose, etc. Thus the basic materials from which cellulosates are produced have the general structures:

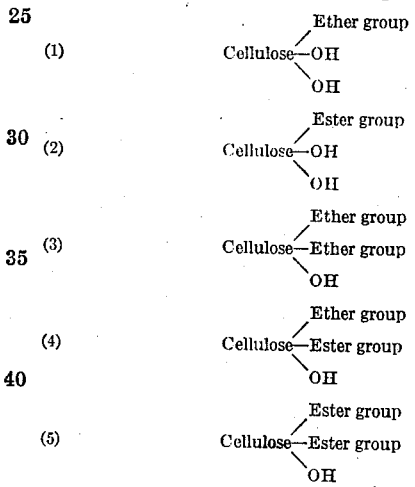

When these basic materials are reacted with equivalent amounts of alkali metals or alkali metal amides it is possible to form mono- and di-cellulosates according to the following equations:

(1) Cellulose derivative—OH+alkali metal or alkali metal amide
=cellulose derivative—O. Alkali metal+hydrogen

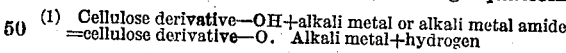

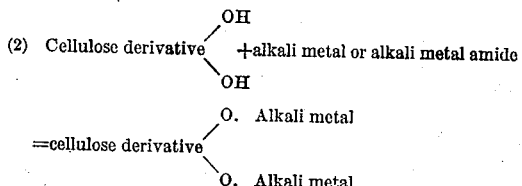

When these cellulosates are reacted in the presence of anhydrous, liquid ammonia with etherifying agents, cellulose ethers are formed by chemical interaction together with alkali metal salts, for example alkali metal halides. Suitable etherifying agents are for example, alkyl halides, aralkyl halides, aryl halides, alkyl sulphates and other inorganic esters of alkyl, aralkyl or aryl alcohols. Methyl bromide, methyl chloride, ethyl bromide, ethyl chloride, propyl bromide, etc., are examples of suitable etherifying agents.

Although the etherification of the cellulosates may be carried out in anhydrous, liquid ammonia per se, I have found that the reaction is favored by the presence of an inert, organic liquid in the ammonia. These liquids must be inert, i. e., they must be substantially resistant to chemical attack by the ammonia, the alkali metals and alkali metal amides. Alkyl substituted aromatic hydrocarbons, for example toluene, are especially useful for this purpose although they are practically insoluble in anhydrous, liquid ammonia. Benzene is also a suitable inert liquid at temperatures above $-33°$ C. These inert, organic liquids probably swell the cellulosates to some extent and promote the reaction of the etherifying agents therewith. They may be added to the ammonia in amounts ranging from about 10 to 50% by volume.

Although one equivalent of an etherifying agent is theoretically sufficient to react with a mono-cellulosate, and although at least one equivalent of an etherifying agent must be used per atom of alkali metal in the partially substituted cellulose, the partially substituted cellulose ether or the partially substituted cellulose ester, I prefer to use the etherifying agent in excess of the theoretical amount since the etherifying agent decomposes to some extent in the ammonia. This excess is not critical, although it is advisable to reduce it to a minimum for reasons of economy. After the reaction is complete, i. e., after allowing the reaction to proceed until the alkali metal employed is substantially completely converted to the alkali metal salt of the acid radical present in the etherifying agent, the cellulose ether may be separated from the reaction mixture by pouring it into hot water or by extracting it with suitable organic solvents, etc. Before the etherifying agent is added to the cellulosate in the anhydrous, liquid ammonia, the ammonia may be evaporated to an extent that the cellulosate is merely moistened therewith.

The following example will serve to illustrate the process in accordance with the present invention:

*Example*

About 10 parts by weight of substantially anhydrous cellulose were introduced into a Dewar flask containing about 150 parts of anhydrous liquid ammonia of about $-33°$ C. and about 25 parts of anhydrous toluene. Two atoms of metallic sodium were added for each anhydroglucose unit of the cellulose to the ammonia-toluene mixture. After several hours the blue color of the sodium had disappeared, indicating a completion of the reaction. During this time most of the ammonia had evaporated from the flask. The mixture was placed in a pressure vessel and brought to a temperature of below $-33°$ C. Ethyl bromide was then added in a great excess over the theoretical amount required to etherify the cellulosate. The vessel was kept below $-33°$ C. for about 12 hours, then after this period the mixture was allowed to gradually reach room temperature. The diethyl cellulose was recovered from the crude reaction mixture and suspended again in anhydrous liquid ammonia containing toluene as set forth above. One atom of metallic sodium was added to the ammonia-toluene mixture to form sodium diethyl cellulosate. This cellulosate was then treated with propyl bromide in anhydrous, liquid ammonia following the procedure outlined above. Diethyl-propyl cellulose was obtained.

Modifications of my invention may be apparent to those skilled in the art, and I desire to include all modifications and variations coming within the scope of the appended claims.

I claim:

1. The process which comprises reacting a partially substituted, anhydrous cellulose with a substance selected from the group consisting of alkali metals and alkali metal amides in a medium comprising anhydrous, liquid ammonia and a liquid, anhydrous hydrocarbon, said hydrocarbon being substantially inert to said cellulose, said ammonia and said substance.

2. The process which comprises reacting a partially substituted cellulose ether with a substance selected from the group consisting of alkali metals and alkali metal amides in a medium comprising anhydrous, liquid ammonia and a liquid, anhydrous hydrocarbon, said hydrocarbon being substantially inert to said cellulose ether, said ammonia and said substance.

3. The process which comprises reacting a partially substituted, anhydrous cellulose with a substance selected from the group consisting of alkali metals and alkali metal amides in a medium comprising anhydrous, liquid ammonia at a temperature below $-33°$ C. and a liquid, anhydrous hydrocarbon, said hydrocarbon being substantially inert to said cellulose, said ammonia and said substance.

4. The process which comprises reacting a partially substituted cellulose ether with a substance selected from the group consisting of alkali metals and alkali metal amides in a medium comprising anhydrous, liquid ammonia at a temperature below $-33°$ C. and a liquid, anhydrous hydrocarbon, said hydrocarbon being substantially inert to said cellulose ether, said ammonia and said substance.

5. The process which comprises reacting a partially substituted, anhydrous cellulose with a substance selected from the group consisting of alkali metals and alkali metal amides in a medium comprising anhydrous, liquid ammonia at a temperature below $-33°$ C. and a liquid, anhydrous alkyl substituted aromatic hydrocarbon, said hydrocarbon being substantially inert to said cellulose, said ammonia and said substance.

6. The process which comprises reacting a partially substituted cellulose ether with a substance selected from the group consisting of alkali metals and alkali metal amides in a medium comprising anhydrous, liquid ammonia at a temperature below $-33°$ C. and a liquid, anhydrous alkyl substituted aromatic hydrocarbon, said hydrocarbon being substantially inert to said cellulose ether, said ammonia and said substance.

7. The process which comprises reacting a partially substituted, anhydrous cellulose with a substance selected from the group consisting of alkali metals and alkali metal amides in a medium comprising anhydrous, liquid ammonia and a liquid, anhydrous alkyl substituted aromatic hydrocarbon, said hydrocarbon being substantially inert to said cellulose, said ammonia and said substance.

8. The process which comprises reacting a partially substituted cellulose ether with a substance selected from the group consisting of alkali metals and alkali metal amides in a medium comprising anhydrous, liquid ammonia and a liquid, anhydrous alkyl substituted aromatic hydrocarbon, said hydrocarbon being substantially inert to said cellulose ether, said ammonia and said substance.

9. The process which comprises reacting a partially substituted cellulose with a substance selected from the group consisting of alkali metals and alkali metal amides in a medium comprising anhydrous, liquid ammonia, the amount of said substance employed being stoichiometrically equivalent to at least one unsubstituted hydroxyl group present in the partially substituted cellulose, until said substance has substantially completely reacted therewith, adding an etherifying agent in an amount at least equal to one equivalent thereof per atom of said substance, and allowing the reaction to proceed until the substance employed is substantially completely converted to the salt of the acid radical present in the etherifying agent and said substance.

10. The process which comprises reacting a partially substituted cellulose ether with a substance selected from the group consisting of alkali metals and alkali metal amides in a medium comprising anhydrous, liquid ammonia, the amount of said substance employed being stoichiometrically equivalent to at least one unsubstituted hydroxyl group present in the partially substituted cellulose, until said substance has substantially completely reacted therewith, adding an etherifying agent in an amount at least equal to one equivalent thereof per atom of said substance, and allowing the reaction to proceed until the substance employed is substantially completely converted to the salt of the acid radical present in the etherifying agent and said substance.

11. The process which comprises reacting a partially substituted cellulose with a substance selected from the group consisting of alkali metals and alkali metal amides in a medium comprising anhydrous, liquid ammonia at a temperature below −33° C., the amount of said substance employed being stoichiometrically equivalent to at least one unsubstituted hydroxyl group present in the partially substituted cellulose, until said substance has substantially completely reacted therewith, adding an etherifying agent in an amount at least equal to one equivalent thereof per atom of said substance, and allowing the reaction to proceed until the substance employed is substantially completely converted to the salt of the acid radical present in the etherifying agent and said substance.

12. The process which comprises reacting a partially substituted cellulose ether with a substance selected from the group consisting of alkali metals and alkali metal amides in a medium comprising anhydrous, liquid ammonia at a temperature below −33° C., the amount of said substance employed being stoichiometrically equivalent to at least one unsubstituted hydroxyl group present in the partially substituted cellulose, until said substance has substantially completely reacted therewith, adding an etherifying agent in an amount at least equal to one equivalent thereof per atom of said substance, and allowing the reaction to proceed until the substance employed is substantially completely converted to the salt of the acid radical present in the etherifying agent and said substance.

13. The process which comprises reacting a partially etherified cellulose with an alkali metal in a medium comprising anhydrous liquid ammonia, the amount of alkali metal employed being stoichiometrically equivalent to the unsubstituted hydroxyl groups present in the partially etherified cellulose, until the alkali metal has substantially completely reacted therewith, adding an etherifying agent in amount equal to at least one equivalent thereof per atom of alkali metal, and allowing the reaction to proceed until the alkali metal employed is substantially completely converted to the alkali metal salt of the acid radical present in the etherifying agent.

14. The process which comprises reacting a partially substituted, anhydrous cellulose with an alkali metal in a medium comprising anhydrous, liquid ammonia and a liquid, anhydrous hydrocarbon, said hydrocarbon being substantially inert to said cellulose, said ammonia and said alkali metal.

15. The process which comprises reacting a partially substituted, anhydrous cellulose with an alkali metal amide in a medium comprising anhydrous, liquid ammonia and a liquid anhydrous hydrocarbon, said hydrocarbon being substantially inert to said cellulose, said ammonia and said alkali metal amide.

16. The process which comprises reacting a partially substituted cellulose ether with an alkali metal in a medium comprising anhydrous, liquid ammonia and a liquid, anhydrous hydrocarbon, said hydrocarbon being substantially inert to said cellulose ether, said ammonia and said alkali metal.

17. The process which comprises reacting a partially substituted cellulose ether with an alkali metal amide in a medium comprising anhydrous, liquid ammonia and a liquid anhydrous hydrocarbon, said hydrocarbon being substantially inert to said cellulose ether, said ammonia and said alkali metal amide.

18. The process which comprises reacting a partially substituted cellulose ether with an alkali metal in a medium comprising anhydrous, liquid ammonia at a temperature below −33° C. and a liquid, anhydrous hydrocarbon, said hydrocarbon being substantially inert to said cellulose ether, said ammonia and said alkali metal.

19. The process which comprises reacting a partially substituted cellulose ether with an alkali metal amide in a medium comprising anhydrous, liquid ammonia at a temperature below −33° C. and a liquid anhydrous hydrocarbon, said hydrocarbon being substantially inert to said cellulose ether, said ammonia and said alkali metal amide.

RUDOLPH S. BLEY.